US008091365B2

(12) United States Patent
Charron

(10) Patent No.: US 8,091,365 B2
(45) Date of Patent: *Jan. 10, 2012

(54) CANTED OUTLET FOR TRANSITION IN A GAS TURBINE ENGINE

(75) Inventor: Richard Charron, West Palm Beach, FL (US)

(73) Assignee: Siemens Energy, Inc., Orlando, FL (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/190,092

(22) Filed: Aug. 12, 2008

(65) Prior Publication Data
US 2010/0037619 A1 Feb. 18, 2010

(51) Int. Cl.
*F02G 3/00* (2006.01)
*F02C 1/00* (2006.01)
(52) U.S. Cl. .................. 60/752; 60/722; 60/804
(58) Field of Classification Search ............. 60/39.37, 60/226.1, 263–264, 722, 752–760, 804, 806
See application file for complete search history.

(56) References Cited

U.S. PATENT DOCUMENTS

| 2,567,079 | A | * | 9/1951 | Owner et al. ............ 60/39.37 |
| 2,596,646 | A | | 5/1952 | Buchi |
| 2,702,454 | A | * | 2/1955 | Brown ..................... 60/800 |
| 2,967,013 | A | | 1/1961 | Dallenbach et al. |
| 3,086,363 | A | * | 4/1963 | Fiori ....................... 60/39.37 |
| 3,184,152 | A | | 5/1965 | Bourquard |
| 3,333,762 | A | | 8/1967 | Vrana |
| 3,420,435 | A | | 1/1969 | Jarosz at al. |
| 3,484,039 | A | | 12/1969 | Mittelstaedt |
| 3,743,436 | A | | 7/1973 | O'Connor |
| 3,759,038 | A | | 9/1973 | Scalzo et al. |
| 3,927,521 | A | * | 12/1975 | Hugoson et al. .......... 60/796 |
| 4,164,845 | A | | 8/1979 | Exley et al. |
| 4,195,474 | A | * | 4/1980 | Bintz et al. ............... 60/730 |
| 4,368,005 | A | | 1/1983 | Exley et al. |
| 4,565,505 | A | | 1/1986 | Woollenweber |
| 4,719,748 | A | * | 1/1988 | Davis et al. .............. 60/39.37 |
| 5,039,317 | A | | 8/1991 | Thompson et al. |
| 5,145,317 | A | | 9/1992 | Brasz |
| 5,320,489 | A | | 6/1994 | McKenna |
| 5,414,999 | A | * | 5/1995 | Barnes ..................... 60/722 |
| 6,280,139 | B1 | | 8/2001 | Romani et al. |
| 6,589,015 | B1 | | 7/2003 | Roberts et al. |
| 6,845,621 | B2 | | 1/2005 | Teets |
| 7,827,801 | B2 | * | 11/2010 | Dawson et al. ........... 60/759 |
| 2003/0167776 | A1 | * | 9/2003 | Coppola ................... 60/800 |
| 2006/0127827 | A1 | | 6/2006 | Yoshida et al. |
| 2007/0017225 | A1 | * | 1/2007 | Bancalari et al. ......... 60/752 |
| 2007/0033941 | A1 | * | 2/2007 | Riggi et al. .............. 60/752 |
| 2007/0240422 | A1 | * | 10/2007 | Jorgensen et al. ........ 60/752 |
| 2008/0087020 | A1 | * | 4/2008 | Hsu et al. ................. 60/752 |

(Continued)

FOREIGN PATENT DOCUMENTS
EP 0648939 A2 4/1995
(Continued)

*Primary Examiner* — William H Rodriguez
*Assistant Examiner* — Michael B Mantyla

(57) ABSTRACT

A transition duct for routing a gas flow from a combustor to the first stage of a turbine section in a combustion turbine engine has an internal passage from an inlet to an outlet. The outlet may include canted sides that reduce formation of damaging vibration in downstream turbine blades caused by downstream wake between adjacent transition ducts and by pressure differentials between adjacent transition ducts that include turning sections.

15 Claims, 3 Drawing Sheets

U.S. PATENT DOCUMENTS

| | | |
|---|---|---|
| 2009/0145137 A1* | 6/2009 | Rizkalla et al. ............... 60/796 |
| 2009/0241505 A1* | 10/2009 | Dinu .......................... 60/39.17 |
| 2009/0252593 A1* | 10/2009 | Chila et al. .................. 415/58.4 |
| 2010/0018211 A1* | 1/2010 | Venkataraman et al. ....... 60/754 |
| 2010/0050649 A1* | 3/2010 | Allen ............................ 60/752 |
| 2010/0077719 A1* | 4/2010 | Wilson et al. ................ 60/39.37 |
| 2010/0170224 A1* | 7/2010 | Clark et al. ................... 60/264 |
| 2010/0170256 A1* | 7/2010 | Kaleeswaran et al. ......... 60/754 |
| 2010/0170259 A1* | 7/2010 | Huffman ....................... 60/755 |
| 2010/0186411 A1* | 7/2010 | Matsuyama et al. ............ 60/725 |
| 2010/0242487 A1* | 9/2010 | Davis et al. .................... 60/772 |

FOREIGN PATENT DOCUMENTS

EP    1903184 A2    3/2008

* cited by examiner

CANTED OUTLET FOR TRANSITION IN A GAS TURBINE ENGINE

FIELD OF THE INVENTION

This invention is directed generally to gas turbine engines, and more particularly to transition ducts for routing gas flow from combustors to the turbine section of gas turbine engines.

BACKGROUND OF THE INVENTION

Referring to FIG. 1, there is shown a cross-section through a portion of a combustion turbine 10. The major components of the turbine are a compressor section 12, a combustion section 14 and a turbine section 16. A rotor assembly 18 is centrally located and extends through the three sections. The compressor section 12 can include cylinders 20, 22 that enclose alternating rows of stationary vanes 24 and rotating blades 26. The stationary vanes 24 can be affixed to the cylinder 20 while the rotating blades 26 can be mounted to the rotor assembly 18 for rotation with the rotor assembly 18.

The combustion section 14 can include a shell 28 that forms a chamber 30. Multiple combustors, for example, sixteen combustors (only one combustor 32 of which is shown) can be contained within the combustion section chamber 30 and distributed around a circle in an annular pattern. Fuel 34, which may be in liquid or gaseous form—such as oil or gas—can enter each combustor 32 and be combined with compressed air introduced into the combustor 32 from the chamber 30, as indicated by the unnumbered arrows surrounding the combustor 32. The combined fuel/air mixture can be burned in the combustor 32 and the resulting hot, compressed gas flow 36 can be exhausted to a transition duct 38 attached to the combustor 32 for routing to the turbine section 16.

The turbine section 16 can include a cylindrical housing 40, including an inner cylinder 42, can enclose rows of stationary vanes and rotating blades, including vanes 44 and blades 46. The stationary vanes 44 can be affixed to the inner cylinder 42 and the rotating blades 46 can be affixed to discs that form parts of the rotor assembly 18 in the region of the turbine section 16. The first row of vanes 44 and the first row of blades 46 near the entry of the turbine section 16 are generally referred to as the first stage vanes and the first stage blades, respectively.

Encircling the rotor assembly 18 in the turbine section 16 can be a series of vane platforms 48, which together with rotor discs 50, collectively define an inner boundary for a gas flow path 52 through the first stage of the turbine section 16. Each transition duct 38 in the combustion section 14 can be mounted to the turbine section housing 40 and the vane platforms 48 to discharge the gas flow 30 towards the first stage vanes 44 and first stage blades 46.

In operation, the compressor section 12 receives air through an intake (not shown) and compresses it. The compressed air enters the chamber 30 in the combustion section 14 and is distributed to each of the combustors 32. In each combustor 32, the fuel 34 and compressed air is mixed and burned. The hot, compressed gas flow 30 is then routed through the transition duct 38 to the turbine section 16. In the turbine section 16, the hot, compressed gas flow is turned by the vanes, such as first stage vane 44 and rotates the blades, such as first stage blade 52, which in turn drive the rotor assembly 18. The gas flow is then exhausted from the turbine section 16. The turbine system 10 can include additional exhaust structure (not shown) downstream of the turbine section 16. The power thus imparted to the rotor assembly 18 can be used not only to rotate the compressor section blades 26 but also to additionally rotate other machinery, such as an external electric generator or a fan for aircraft propulsion (not shown).

For a better understanding of the invention, a coordinate system can be applied to such a turbine system to assist in the description of the relative location of components in the system and movement within the system. The axis of rotation of the rotor assembly 18 extends longitudinally through the compressor section 12, the combustion section 14 and the turbine section 16 and defines a longitudinal direction. Viewed from the perspective of the general operational flow pattern through the various sections, the turbine components can be described as being located longitudinally upstream or downstream relative to each other. For example, the compressor section 12 is longitudinally upstream of the combustion section 14 and the turbine section 16 is longitudinally downstream of the combustion section 14. The location of the various components away from the central rotor axis or other longitudinal axis can be described in a radial direction. Thus, for example, the blade 46 extends in a radial direction, or radially, from the rotor disc 50, Locations further away from a longitudinal axis, such as the central rotor axis, can be described as radially outward or outboard compared to closer locations that are radially inward or inboard.

The third coordinate direction—a circumferential direction—can describe the location of a particular component with reference to an imaginary circle around a longitudinal axis, such as the central axis of the rotor assembly 18. For example, looking longitudinally downstream at an array of turbine blades in a turbine engine, one would see each of the blades extending radially outwardly in several radial directions like hands on a clock. The "clock" position—also referred to as the angular position—of each blade describes its location in the circumferential direction. Thus, a blade in this example extending vertically from the rotor disc can be described as being located at the "12 o'clock" position in the circumferential direction while a blade extending to the right from the rotor disc can be described as being located at the "3 o'clock" position in the circumferential direction, and these two blades can be described as being spaced apart in the circumferential direction. Thus, the radial direction can describe the size of the reference circle and the circumferential direction can describe the angular location on the reference circle.

Generally, the longitudinal direction, the radial direction and the circumferential direction are orthogonal to each other. Also, direction does not connote positive or negative. For example, the longitudinal direction can be both upstream and downstream and need not coincide with the central axis of the rotor. The radial direction can be inward and outward, and is not limited to describing circular objects or arrays. The circumferential direction can be clockwise and counter-clockwise, and, like the radial direction, need not be limited to describing circular objects or arrays.

Further, depending on the context, the relevant position of two components relative to each other can be described with reference to just one of the coordinate directions. For example, the combustor 32 can be described as radially outboard of the rotating blade 46 because the combustor 32 is located radially further away from the central axis of the rotor assembly 18 than the rotating blade 46 is—even though the combustor 32 is not in the same longitudinal plane of the rotating blade 46, and in fact, is longitudinally upstream of the rotating blade 46 and may not be circumferentially aligned with a particular rotating blade 46.

The coordinate system can also be referenced to describe movement. For example, gas flow 36 in the transition 38 is shown to flow in the direction of arrow 36. This gas flow 36 travels both longitudinally downstream from the combustor 32 to the turbine section 16 and radially inward from the combustor 32 to the first stage vanes 44 and blades 46.

In the context of describing movement, such as the flow of a gas, the circumferential direction can also be referred to as the tangential direction. When gas flows in the circumferential direction, a component of the flow direction is tangential to a point on the circular path. At any given point on the circle path, the circumferential flow can have a relatively larger tangential component and a relatively smaller radial component. Since the tangential component predominates, particularly for larger diameter paths, such as around vane and blade arrays in a turbine engine, a circumferential direction and tangential direction can be regarded as substantially the same.

Bearing this coordinate system in mind and referring to FIG. 2, a transition duct 54 is shown alone as it would be seen when viewed from longitudinally downstream. This particular transition duct 54 is oriented in the 12 o'clock circumferential position and it should be understood that a turbine engine would have additional transition ducts, for example, a total of sixteen, spaced in an annular array.

The transition duct 54 can include a transition duct body 56 having an inlet 58 for receiving a gas flow exhausted by an associated combustor (not shown, but see FIG. 1). The transition duct body 56 can include an internal passage 60 from the inlet 58 to an outlet 62 from which the gas flow is discharged towards the turbine section (not shown). Because the combustor is radially outboard of the first stage of the turbine section (see FIG. 1), the transition duct 54 extends radially inwardly from its inlet 58 to its outlet 62. In FIG. 2, this radial direction is depicted by the axis 64. The transition duct 54 includes a longitudinal bend 66 near the outlet 62 to discharge the gas flow predominantly longitudinally. Because the gas flow in the transition duct 54 is redirected radially inwardly and then longitudinally, the transition duct 54 experiences substantial turning in the radial direction 64. This radial thrust pushes the outlet region of the transition duct 54 radially outwardly (up in the plane of the page of the figure). To support the transition duct 54 against this bending thrust, the transition duct 54 can be radially supported by various braces (not shown) at its ends, as it well known in the art. It can be seen that the outlet 62 and the inlet 58 are aligned along the circumferential or tangential direction, which is depicted by the axis 68.

Reference is now made to FIG. 3, focusing on a turbine subsection 70 that includes a combustor 72, a transition duct 74 and first stage vanes 76 and blades 78. FIG. 3 shows a view from above of the combustor 72, the transition duct 74, a few first stage vanes 76 and a few first stage blades 78, illustrated schematically. It should be understood that in a turbine, there would be additional first stage vanes spaced apart circumferentially to form an annular array. Similarly, there would be additional first stage blades spaced apart circumferentially to form an annular array. These additional vanes and blades are not shown in FIG. 3 to facilitate illustration. A turbine system would typically also include additional combustors and transitions, but a single combustor 72 and transition 74 are shown schematically for purposes of illustration.

From this top view, the longitudinal direction can be noted by reference to the axis 80. The circumferential or tangential direction can be noted by reference to the axis 82. The radial direction is not illustrated because the radial direction lies into and out of the page of the figure, but would be generally orthogonal to the longitudinal direction and the radial direction.

Gas flow, such as hot, compressed gas with perhaps some limited liquid content, is exhausted from the combustor 72 and routed by the transition duct 74 to the first stage vanes 76 and blades 78. The gas flow as discharged from the exit or outlet 86 of the transition duct 74 generally travels downstream in the longitudinal direction, as indicated by the arrow 84. There may be some incidental, small-scale radial and circumferential flow components to the discharged gas flow that produce a downstream wake due to edge conditions 86 at the outlet and other factors. The downstream wake can create vibrations in downstream turbine blades.

As this longitudinal gas flow 84 discharges from the outlet 86 of the transition duct 74, the flow passes the first stage vanes 76. The function of the first stage vanes 76 is to accelerate and turn the predominantly longitudinal flow in the circumferential direction 82 so that the predominant flow direction of the gas flow leaving the trailing edges of vanes 76 is angled in the circumferential or tangential direction relative to the longitudinal direction as shown, for example, by the arrow 88. This turned flow 88 thus has a longitudinal component and a circumferential component. The flow angle can be substantial, in the range of 40 degrees to 85 degrees measured from the longitudinal axis 80. By accelerating and angling the gas flow in the circumferential direction 82 relative to the longitudinal direction 80, the resulting gas flow 88 more effectively imparts its energy to the first row blades 78, which in turn rotate the associated rotor assembly (not shown).

The use of first stage vanes to accelerate and turn the longitudinal gas flow in the circumferential direction present several challenges. The vanes and the associated vane support structure (see FIG. 1) must have high strength characteristics to withstand the forces generated in changing the direction of a extremely hot, high pressure gas flow over a substantial angle in a relatively short distance. The temperature of the gas flow and the heat generated by this turning process also require a vane cooling system. The forces and heat involved diminish material properties that can crack and otherwise damage the vanes and associated support structure. To address these various requirements and operating conditions, the first stage vanes and the associated support structure and cooling systems have developed into a complex system that can be expensive to manufacture, install, and, in the event of damage, repair and replace. Thus, there is a need to accelerate and tangentially turn a gas flow for presentation to a first stage blade array without the complications and related costs and damage risks associated with first stage vanes.

Additionally, transitions have been designed that combine the features of conventional transitions with the turning capabilities of the row one vanes. The transitions include curved sections that turn the combustor gases. The curved sections create pressure differentials within the transitions. In particular, the turning sections create high pressure along the outer wall of the curved section and low pressure along the inner wall of the curved section. In turbine engines using these combined transitions and row one vanes, the row one vanes are eliminated. Instead, there is a first row of rotational blades located immediately downstream of the transitions. The transitions turn the combustors gases such that the combustor gases exit the transition nonparallel to a longitudinal axis of the turbine engine and in proper alignment to strike the downstream turbine vanes. Because the turning sections create the pressure differential, the turbine blades move through numerous abrupt pressure changes between adjacent exits of the transitions. Each abrupt pressure change creates a vibration in a turbine blade. As the turbine blade makes a single revolution, the turbine blade is exposed to a plurality of these pressure changes, which thereby create numerous damaging vibrations on the blade during each revolution. In a turbine engine with sixteen transitions, a turbine blade would pass through sixteen abrupt pressure gradients in a single revolution. Thus, a need exists for improving upon said turbine engine configuration.

SUMMARY OF THE INVENTION

This invention is directed to a transition duct for routing gas flow from a combustor to a turbine section of a turbine engine. The transition may be configured to include an outlet with canted side surfaces that is configured to reduce downstream wake thereby resulting in reduced vibration in downstream turbine vanes. In embodiments in which the transition includes a curved portion for directing the combustor gases, the outlet with canted side surfaces reduces the affect of the pressure gradient that exists at the outlet upon downstream turbine blades. As such, the outlet reduces inefficiencies caused by the combustor gases exiting the transition duct.

The transition duct may be configured to route gas flow in a combustion turbine subsystem that includes a first stage blade array having a plurality of blades extending in a radial direction from a rotor assembly for rotation in a circumferential direction, said circumferential direction having a tangential direction component, the rotor assembly axis defining a longitudinal direction, and at least one combustor located longitudinally upstream of the first stage blade array and located radially outboard of the first stage blade array. The transition duct may be formed from a transition duct body having an internal passage extending between an inlet and an outlet. The outlet may be offset from the inlet in the longitudinal direction. The outlet may be formed from a radially outer side generally opposite to a radially inner side, and the radially outer and inner sides may be coupled together with opposed first and second side walls. The first side wall may be canted relative to a radial axis when viewing the outlet longitudinally upstream. The second side wall may also be canted relative to a radial axis when viewing the outlet longitudinally upstream. In one embodiment, the second side wall may be nonparallel to the first side wall of the outlet. The first or second side walls, or both, may be canted between about 20 and about 70 degrees relative to a radial axis when viewing the outlet longitudinally upstream, More particularly, the first or second side walls, or both, may be canted between about 30 and about 60 degrees relative to a radial axis when viewing the outlet longitudinally upstream.

In some embodiments, the transition duct body may be generally linear. In other embodiments, the transition duct body may include a curved portion to redirect the combustor gases and eliminate the row one vanes. In particular, the outlet may be offset from the inlet in the tangential direction, and the internal passage may be curved to the offset outlet, whereby a gas flow discharges from the outlet at an angle between the longitudinal direction and the tangential direction when the transition duct body is located between the combustor and the first stage blade array to receive the gas flow from the combustor into the internal passage through the inlet and to discharge the gas flow toward the first stage blade array. Both transition duct configurations, and other transition duct configurations not described herein, may include the outlet of this invention.

During operation, hot combustor gases flow from a combustor into inlets of the transitions. The gases are directed through the internal passages. In transitions that are straight the gases are exhausted through the outlets. The canted first and second sides of the outlet distribute the wake across a downstream turbine vane and blade. In particular, the wake is distributed from a pressure side, across a leading edge of the vane, to a suction side, thereby distributing the wake across the entire vane. Such a configuration reduces vibrations and stresses in the downstream, stationary turbine vanes and blades. In transitions that include curved sections, the gases are exhausted through the outlets. The canted first and second sides of the outlet distribute not only the wake, but also reduce the affects of the pressure gradient between adjacent transitions on downstream turbine blades by mixing the high and low pressure regions. The canted first and second side surfaces reduce the affects of the high and low pressure regions because when taken along a radial axis extending across the canted first and second sides, the transition between the high pressure region to the low pressure region is more gradual as a turbine blade moves past the wake interface between adjacent transitions than if the first and second sides are aligned with the radial axis. As such, a downstream turbine blade encounters less drastic pressure changes when rotating about an axis in a turbine engine having transitions with the canted first and second sides.

An advantage of this invention in that the canted sides of the outlet of the transition reduce the trailing wake affect on the trailing turbine vanes.

Another advantage of this invention is that canted sides of the outlet of the curved transition reduce affects on downstream turbine blades caused by pressure gradients developed in the transition. The canted sides of the outlet create a more gradual change moving circumferentially about the annular path of the turbine blades, thereby eliminating the abrupt pressure changes of radially aligned transition sides of other transition designs. Eliminating the abrupt pressure changes eliminates the vibrations created by these changes on the turbine blades as the blades rotate about the rotational axis and encounter sixteen such pressure changes upon each revolution.

Yet another advantage of this invention is that the canted side of the outlet of the transition enables a higher incidence angle to be used with the curvature within the transition. Thus, a more exaggerated curve may be incorporated within the transition including the canted sides, thereby facilitating improved angles of discharge of the combustor gases to downstream turbine blades.

Another advantage of this invention is that the increased incidence angle also decreases the amount of uncovered turning of gases exiting the transition, thereby making the flow more stable through the range of operating power levels and enabling more power to be extracted from the first stages of the turbine.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF EMBODIMENTS OF THE INVENTION

Figure 1:
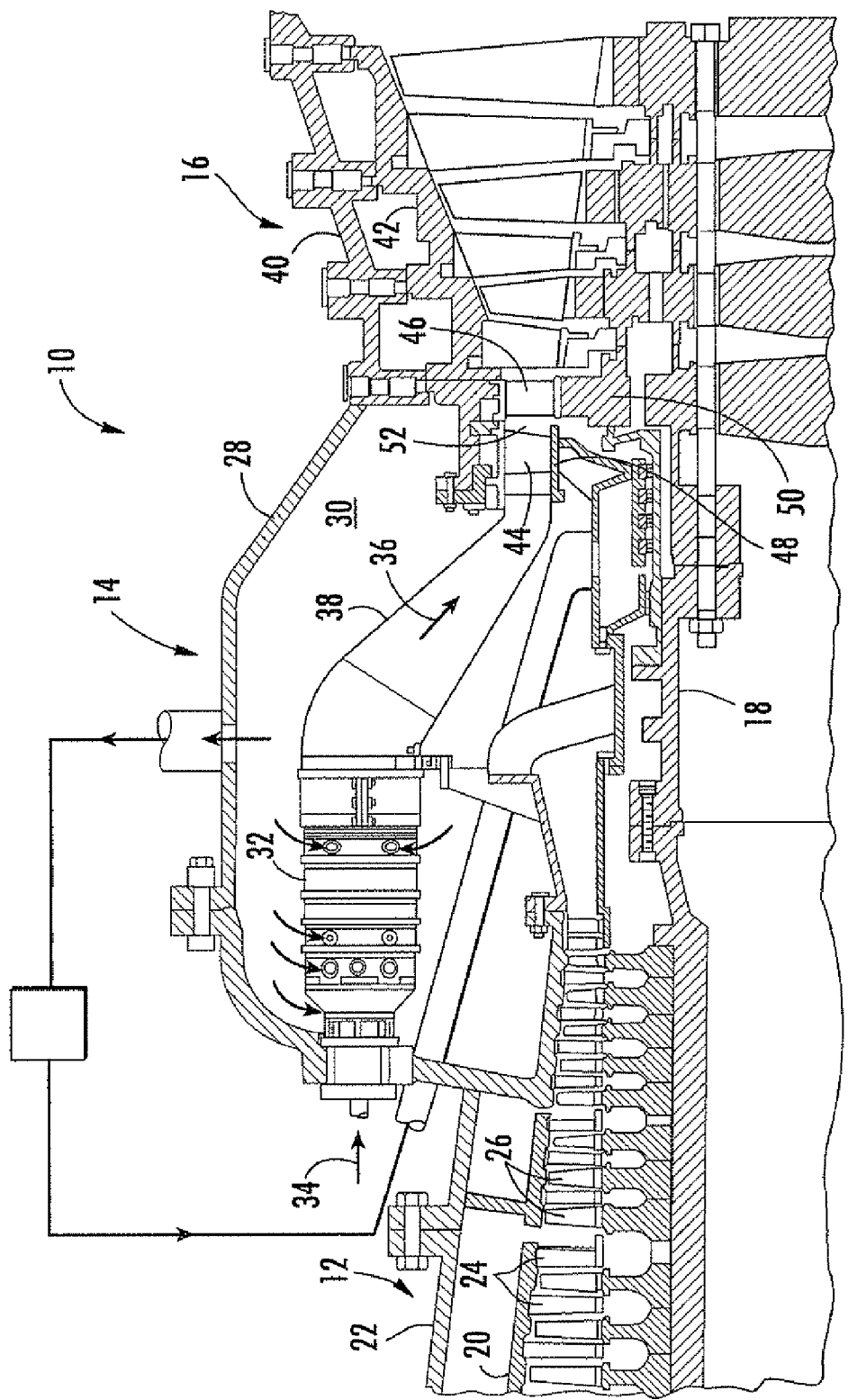
FIG. 1 is a cross-sectional view of a portion of a prior turbine engine.
Figure 2:
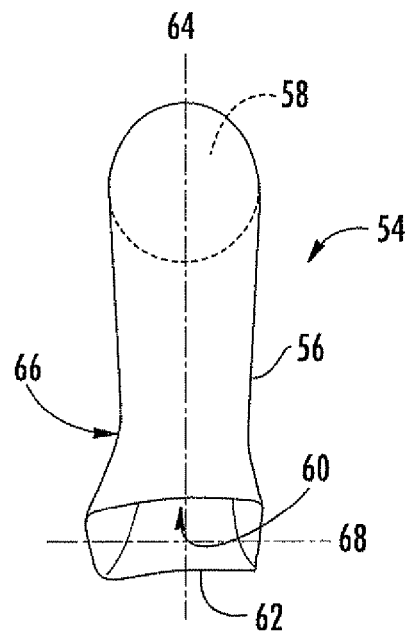
FIG. 2 is an upstream longitudinal view of a prior transition duct.
Figure 3:
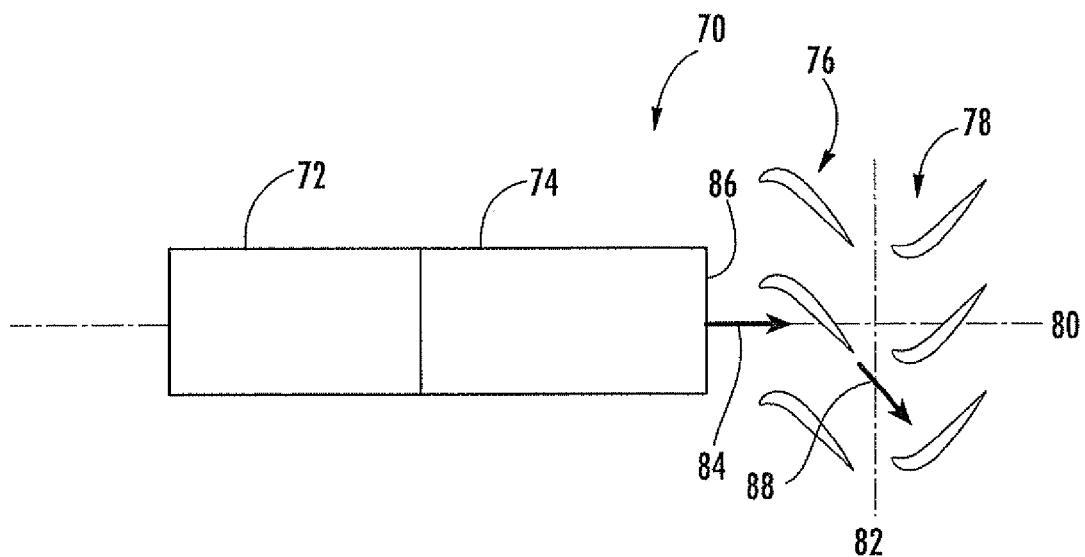
FIG. 3 is a schematic radial view of a combustor, transition duct and first stage vanes and blades of a prior turbine engine.
Figure 4:
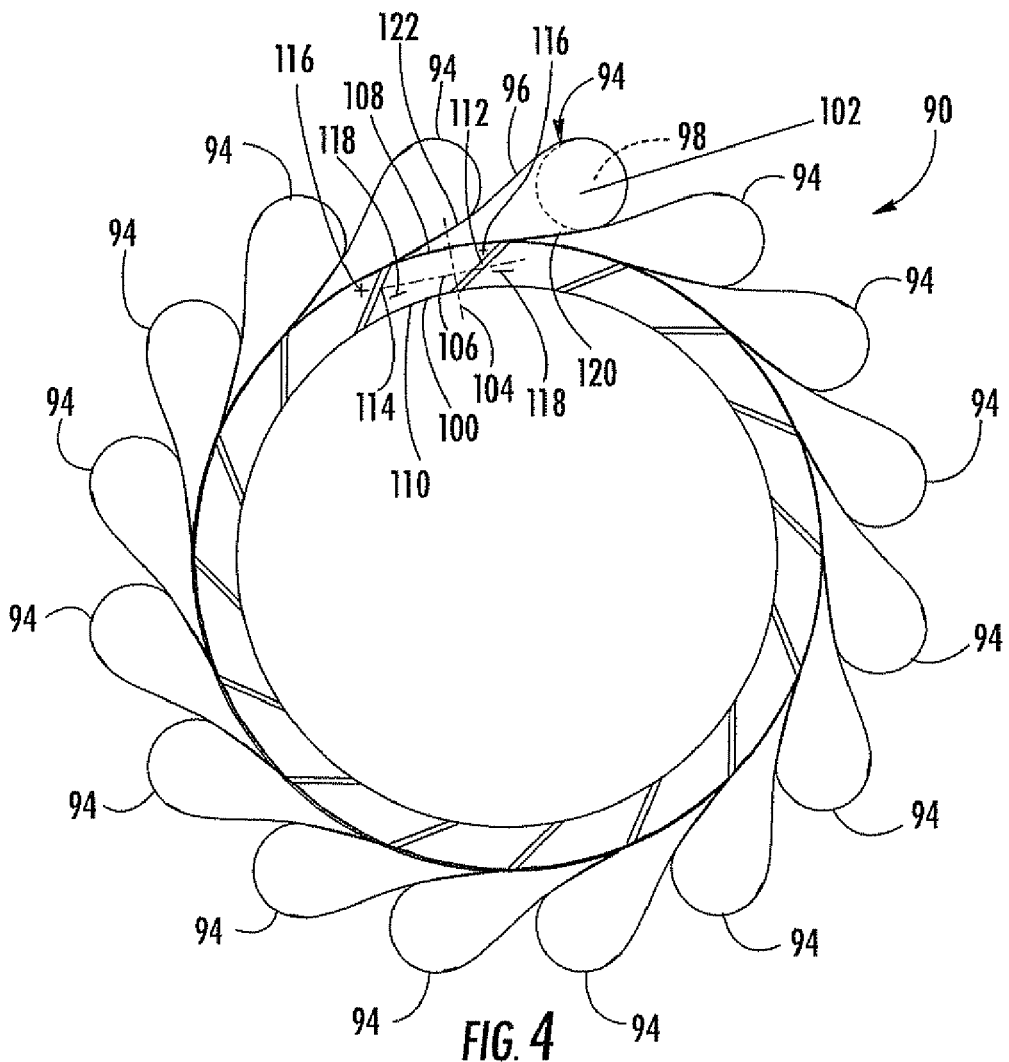
FIG. 4 is an longitudinal upstream view of a circular array of transition ducts embodying aspects of the invention.
Figure 5:
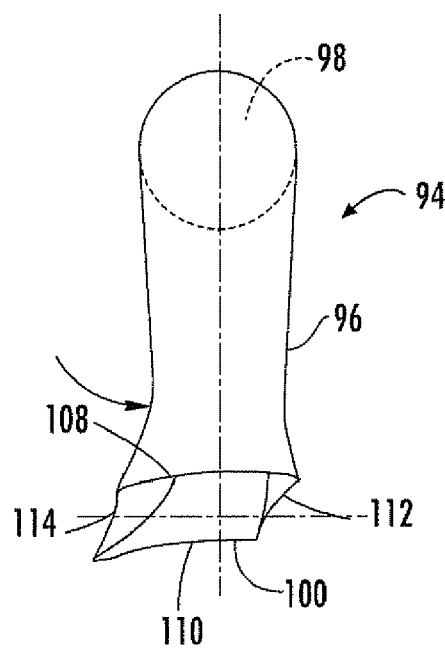
FIG. 5 is a upstream longitudinal view of a single transition duct as shown in FIG. 4.

As shown in FIGS. 4 and 5, this invention is directed to a transition duct 94 for routing gas flow from a combustor to a turbine section of a turbine engine. The transition 94 may be configured to include an outlet 100 with canted side surfaces 112, 114 that is configured to reduce downstream wake thereby resulting in reduced vibration in downstream turbine vanes. In embodiments in which the transition 94 includes a curved portion for directing the combustor gases, the outlet 100 with canted side surfaces 112, 114 reduces the affect of the pressure gradient the exists at the outlet 100 upon downstream turbine blades. As such, the outlet 100 reduces inefficiencies caused by the combustor gases exiting the transition duct 94.

As shown in FIG. 4, the transition ducts 94 may be positioned in an annular array 90, as shown without surrounding turbine components in an elevation as viewed from longitudinally downstream in a turbine. The longitudinal axis is not shown because it is orthogonal to the axes 104, 106 and extends into and out of the page of the figures. Each transition duct 94 can include a transition body 96 having an inlet 98 and an outlet 100 and an internal passage 102 between the inlet 98 and the outlet 100 for routing a gas flow through the transition duct 94 from the inlet 98 to the outlet 100. The array 90 is shown illustrating an arrangement for use in a combustion turbine engine having 16 combustors (not shown). However, the number of transition ducts 94 and their annular arrangement can be varied for use with more or less combustors.

As shown in FIGS. 4 and 5, the transition duct 94 may include an outlet 100 formed from a radially outer side 108 generally opposite to a radially inner side 110. The radially outer and inner sides 108, 110 may be coupled together with opposed first and second side walls 112, 114. The outlet 100 may be offset from the inlet 98 in the longitudinal direction. The term "offset" as used herein and in the claims means that the outlet is spaced from the inlet as measured along the coordinate direction(s) identified. The outlet 100 may also be offset from the inlet 98 in a tangential direction 106, and the internal passage 102 may be curved to the offset outlet 100, whereby a gas flow discharges from the outlet 100 at an angle between the longitudinal direction and the tangential direction 106 when the transition duct body 96 is located between the combustor and the first stage blade array to receive the gas flow from the combustor into the internal passage 102 through the inlet 98 and to discharge the gas flow toward the first stage blade array.

As shown FIG. 4 The first side wall 112 may be canted relative to a radial axis 104 when viewing the outlet longitudinally upstream. The second side wall 114 may be canted relative to the radial axis 104 when viewing the outlet longitudinally upstream. In one embodiment, the first and second side walls 112, 114 may be canted between about 20 and about 70 degrees relative to the radial axis 104 when viewing the outlet longitudinally upstream. More particularly, the first and second side walls 112, 114 may be canted between about 30 and about 60 degrees relative to the radial axis 104 when viewing the outlet longitudinally upstream. In one embodiment, as shown in FIG. 4, the second side wall 114 may be nonparallel to the first side wall 112 of the outlet 100.

The first and second sides walls 112, 114 may be canted as shown in FIGS. 4 and 5 to reduce the affects of the pressure differential between high pressure regions, denoted by the plus sign 116, and the low pressure regions, denoted by the minus sign 118. The high and low pressure regions 116, 118 exist within the same transition but in different portions of the cross-section. Such is the case because as the hot combustor gases flow quickly and accelerate through the transition 94, the curve of the flow path in the transition 94 causes a high pressure region to develop proximate to a shorter side 120 of the curve and a low pressure region to develop at the longer side 122 of the curve.

Inclusion of the canted first and second sides 112, 114 in the outlet 100 facilitates an increased incidence angle, which is the angle between the longitudinal axis and the linear flow path at the outlet 100 of the transition 94. A higher incidence angle, which is an angle at which the discharge gas flow path is moving further way from alignment with the longitudinal axis, enables a more exaggerated curve to be incorporated within the transition 94 including the canted sides 112, 114, thereby facilitating improved angles of discharge of the combustor gases to downstream turbine blades. The increased incidence angle also decreases the amount of uncovered turning of gases exiting the transition, thereby making the flow more stable through the range of operating power levels and enabling more power to be extracted from the first stages of the turbine. Uncovered turning is found where the shorter side 120 of the curve stops yet the longer side 122 of the curve continues. In such a region, the shorter side 120, which is the outer side, does not exist to guide the gases to continue the curve.

During operation, hot combustor gases flow from a combustor into inlets 98 of the transitions 94. The gases are directed through the internal passages 102. In transitions 94 that are straight, the gases are exhausted through the outlets 100. The canted first and second sides 112, 114 of the outlet 100 distribute the wake across a downstream turbine vane. In particular, the wake is distributed from a pressure side, across a leading edge of the vane, to a suction side, thereby distributing the wake across the entire vane. Such a configuration reduces vibrations and stresses in the downstream, stationary turbine vanes. In transitions that include curved sections, the gases are exhausted through the outlets 100. The canted first and second sides 112, 114 of the outlet 100 distribute not only the wake, but also reduce the affects of the pressure gradient between adjacent transitions 94 on downstream turbine blades by mixing the high and low pressure regions 116, 118. The canted first and second side surfaces 112, 114 reduce the affects of the high and low pressure regions 116, 118 because when taken along a radial axis 104 crossing the canted first and second sides 112, 114, the transition between the high pressure region 116 to the low pressure region 118 is more gradual than if the first and second sides 112, 114 are aligned with the radial axis 104. As such, a downstream turbine blade encounters less drastic pressure changes when rotating about an axis in a turbine engine having transitions 94 with the canted first and second sides 112, 114.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A transition duct for routing gas flow in a combustion turbine subsystem that includes a first stage blade array having a plurality of blades extending in a radial direction from a rotor assembly for rotation in a circumferential direction, said circumferential direction having a tangential direction component, the rotor assembly axis defining a longitudinal direction, and at least one combustor located longitudinally upstream of the first stage blade array and located radially outboard of the first stage blade array, said transition duct, comprising:

a transition duct body having an internal passage extending between an inlet and an outlet;

wherein the outlet is offset from the inlet in the longitudinal direction;

wherein the outlet is formed from a radially outer side generally opposite to a radially inner side, and the radially outer and inner sides are coupled together with opposed first and second side walls;

wherein the first side wall is canted relative to a radial axis when viewing the outlet longitudinally upstream; and wherein the second side wall is canted in a generally same direction as the first side wall relative to a radial axis when viewing the outlet longitudinally upstream;

wherein the second side wall is nonparallel to the first side wall of the outlet.

2. The transition duct of claim 1, wherein the first side wall is canted between about 20 and about 70 degrees relative to a radial axis when viewing the outlet longitudinally upstream.

3. The transition duct of claim 2, wherein the first side wall is canted between about 30 and about 60 degrees relative to a radial axis when viewing the outlet longitudinally upstream.

4. The transition duct of claim 1, wherein the outlet is offset from the inlet in the tangential direction and the internal passage is curved to the offset outlet, whereby a gas flow discharges from the outlet at an angle between the longitudinal direction and the tangential direction when the transition duct body is located between the combustor and the first stage blade array to receive the gas flow from the combustor into the internal passage through the inlet and to discharge the gas flow toward the first stage blade array.

5. The transition duct of claim 4, wherein the second side wall is canted relative to a radial axis.

6. The transition duct of claim 5, wherein the second side wall is nonparallel to the first side wall of the outlet.

7. The transition duct of claim 4, wherein the first side wall is canted between about 20 and about 70 degrees relative to a radial axis when viewing the outlet longitudinally upstream.

8. The transition duct of claim 7, wherein the first side wall is canted between about 30 and about 60 degrees relative to a radial axis when viewing the outlet longitudinally upstream.

9. A transition duct for routing gas flow in a combustion turbine subsystem that includes a first stage blade array having a plurality of blades extending in a radial direction from a rotor assembly for rotation in a circumferential direction, said circumferential direction having a tangential direction component, the rotor assembly axis defining a longitudinal direction, and at least one combustor located longitudinally upstream of the first stage blade array and located radially outboard of the first stage blade array, said transition duct, comprising:

a transition duct body having an internal passage extending between an inlet and an outlet;

wherein the outlet is offset from the inlet in the longitudinal direction;

wherein the outlet is formed from a radially outer side generally opposite to a radially inner side, and the radially outer and inner sides are coupled together with opposed first and second side walls;

wherein the first side wall is canted relative to a radial axis when viewing the outlet longitudinally upstream, and the second side wall is canted in a generally same direction as the first side wall relative to a radial axis when viewing the outlet longitudinally upstream;

wherein the second side wall is nonparallel to the first side wall of the outlet; and wherein the first and second side walls are canted between about 20 and about 70 degrees relative to a radial axis when viewing the outlet longitudinally upstream.

10. The transition duct of claim 9, herein the first and second side walls are canted between about 30 and about 60 degrees relative to a radial axis when viewing the outlet longitudinally upstream.

11. The transition duct of claim 9, wherein the outlet is offset from the inlet in the tangential direction and the internal passage is curved to the offset outlet, whereby a gas flow discharges from the outlet at an angle between the longitudinal direction and the tangential direction when the transition duct body is located between the combustor and the first stage blade array to receive the gas flow from the combustor into the internal passage through the inlet and to discharge the gas flow toward the first stage blade array.

12. The transition duct of claim 11, wherein the second side wall is nonparallel to the first side wall of the outlet.

13. The transition duct of claim 11, wherein the first and second side walls are canted between about 20 and about 70 degrees relative to a radial axis when viewing the outlet longitudinally upstream.

14. The transition duct of claim 13, wherein the first and second side walls are canted between about 30 and about 60 degrees relative to a radial axis when viewing the outlet longitudinally upstream.

15. A transition duct for routing gas flow in a combustion turbine subsystem that includes a first stage blade array having a plurality of blades extending in a radial direction from a rotor assembly for rotation in a circumferential direction, said circumferential direction having a tangential direction component, the rotor assembly axis defining a longitudinal direction, and at least one combustor located longitudinally upstream of the first stage blade array and located radially outboard of the first stage blade array, said transition duct, comprising:

a transition duct body having an internal passage extending between an inlet and an outlet, wherein the outlet is offset from the inlet in the tangential direction and the internal passage is curved to the offset outlet, whereby a gas flow discharges from the outlet at an angle between the longitudinal direction and the tangential direction when the transition duct body is located between the combustor and the first stage blade array to receive the gas flow from the combustor into the internal passage through the inlet and to discharge the gas flow toward the first stage blade array;

wherein the outlet is formed from a radially outer side generally opposite to a radially inner side, and the radially outer and inner sides are coupled together with opposed first and second side walls; and wherein the first side wall is canted relative to a radial axis when viewing the outlet longitudinally upstream, the second side wall is canted in a generally same direction as the first side wall relative to a radial axis when viewing the outlet longitudinally upstream and the second side wall is nonparallel to the first side wall of the outlet; and wherein the second side wall is canted between about 30 and about 60 degrees relative to a radial axis when viewing the outlet longitudinally upstream.

* * * * *